United States Patent

Kim et al.

(10) Patent No.: US 9,579,837 B2
(45) Date of Patent: Feb. 28, 2017

(54) METHOD AND APPARATUS FOR TREATING WASTE MATERIALS

(75) Inventors: Jay Kim, Surrey, CA (US); Wesley Tse, Coquitlam, CA (US)

(73) Assignee: GOOD MORNING ENTERPRISES INC., British Columbia (CA)

( * ) Notice: Subject to any disclaimer, the term of this patent is extended or adjusted under 35 U.S.C. 154(b) by 609 days.

(21) Appl. No.: 14/004,250

(22) PCT Filed: Feb. 17, 2012

(86) PCT No.: PCT/CA2012/000147
§ 371 (c)(1),
(2), (4) Date: Dec. 23, 2013

(87) PCT Pub. No.: WO2012/119219
PCT Pub. Date: Sep. 13, 2012

(65) Prior Publication Data
US 2014/0099447 A1   Apr. 10, 2014

(30) Foreign Application Priority Data

Mar. 10, 2011 (CA) .................................... 2733685

(51) Int. Cl.
B29C 47/00 (2006.01)
C02F 11/14 (2006.01)
(Continued)

(52) U.S. Cl.
CPC ........ B29C 47/0066 (2013.01); B09B 3/0083 (2013.01); C02F 11/14 (2013.01);
(Continued)

(58) Field of Classification Search
CPC ................ B29C 47/0066; C04B 35/56; C04B 35/62204; C04B 2235/3463;
(Continued)

(56) References Cited

U.S. PATENT DOCUMENTS 1,898,326 A * 2/1933 Wahlstrom .............. C10B 47/46
201/2.5
4,032,476 A * 6/1977 Murty ..................... C01B 31/14
264/29.1
(Continued)

OTHER PUBLICATIONS

PCT International Search Report issued May 15, 2012, by the Canadian Intellectual Property Office, The Receiving Office for International PCT Patent Application No. PCT/CA2012/000147 Filed Feb. 17, 2012.
(Continued)

Primary Examiner — Nahida Sultana
(74) Attorney, Agent, or Firm — Gowling WLG (Canada) LLP

(57) ABSTRACT

A method and apparatus for treating waste materials comprising, particulating the waste materials into discrete particles, heating and drying the particles in a non-oxidizing atmosphere in a drier at a temperature in the range of 800° to 860° C. for carbonizing the particles, crushing the carbonized particles and leaching the crushed carbonized particles in an acid solution for dissolution of heavy metals into the solution, separating the leach solution containing heavy metal from the carbonized particles, adding to the carbonized particles particulate sodium hydroxide, silica, feldspar and limestone in a ratio of 100:0.3-0.5:8-12:2-4, mixing said particles with 15 to 18% by weight water to form a wet mixture and continuously extruding the wet mixture to form an elongated continuous extrusion, severing the elongated extrusion into blocks or planks of predetermined length, drying the blocks or planks and heating the dried blocks or planks in a kiln at a temperature in the range of 1200° to 1300° C. for a time sufficient in an oxygen deficient atmosphere to sinter the blocks or planks and to form carbides, and separating and recovering $CO_2$ gas from combustion gases in the kiln.

15 Claims, 7 Drawing Sheets

(51) Int. Cl.
*C02F 11/18* (2006.01)
*B09B 3/00* (2006.01)
*C04B 35/56* (2006.01)
*C04B 35/622* (2006.01)
*C02F 101/20* (2006.01)
*B09B 5/00* (2006.01)

(52) U.S. Cl.
CPC .............. *C02F 11/18* (2013.01); *C04B 35/56* (2013.01); *C04B 35/62204* (2013.01); *B09B 5/00* (2013.01); *C02F 2101/20* (2013.01); *C04B 2235/3208* (2013.01); *C04B 2235/3418* (2013.01); *C04B 2235/3463* (2013.01); *C04B 2235/3472* (2013.01); *C04B 2235/3481* (2013.01); *Y02W 30/20* (2015.05)

(58) Field of Classification Search
CPC .... C04B 2235/3418; C04B 2235/3472; C04B 2235/3481; C04B 2235/3208; B09B 3/0083; B09B 5/00; C02F 11/14; C02F 11/18; C02F 2101/20; Y02W 30/20
USPC ............. 264/29.1, 19.6, 29.7, 36.1, DIG. 66, 264/DIG. 63, 141–142, 145
See application file for complete search history.

(56) References Cited

U.S. PATENT DOCUMENTS

| | | | |
|---|---|---|---|
| 4,129,420 A | 12/1978 | Koppelman | |
| 4,624,417 A | 11/1986 | Gangi | |
| 5,087,375 A | 2/1992 | Weinwurm | |
| 5,810,961 A * | 9/1998 | Andersen | B05B 11/0037 156/324 |
| 6,589,654 B1 * | 7/2003 | Arcaini | A62D 3/33 106/405 |
| 7,611,576 B2 | 11/2009 | Rabiner | |
| 2006/0213397 A1 * | 9/2006 | Bethani | C04B 18/023 106/407 |

OTHER PUBLICATIONS

International Preliminary Report on Patentability issued Sep. 10, 2013, by The International Bureau of WIPO, for International PCT Patent Application No. PCT/CA2012/000147 Filed Feb. 17, 2012.
Slim, J.A. et al.; "The utilisation of sewage sludge in the manufacture of clay bricks"; Water SA; vol. 17; No. 3; Jul. 1991; pp. 197-202.

* cited by examiner

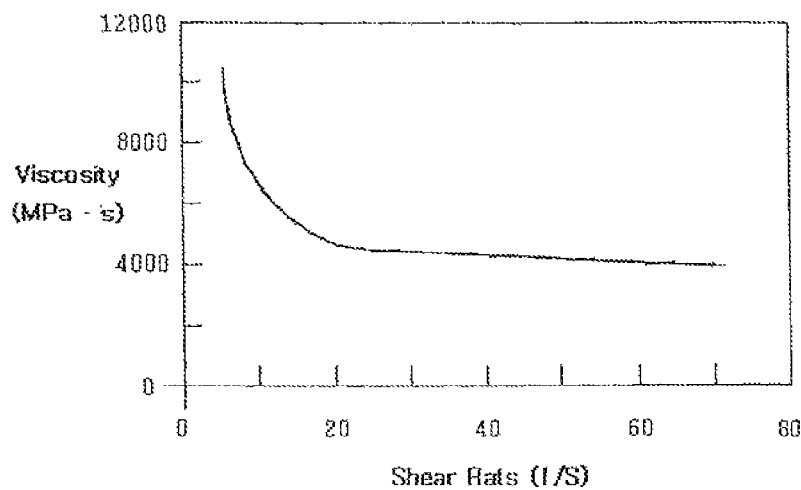
Fig. 10
Fig. 11
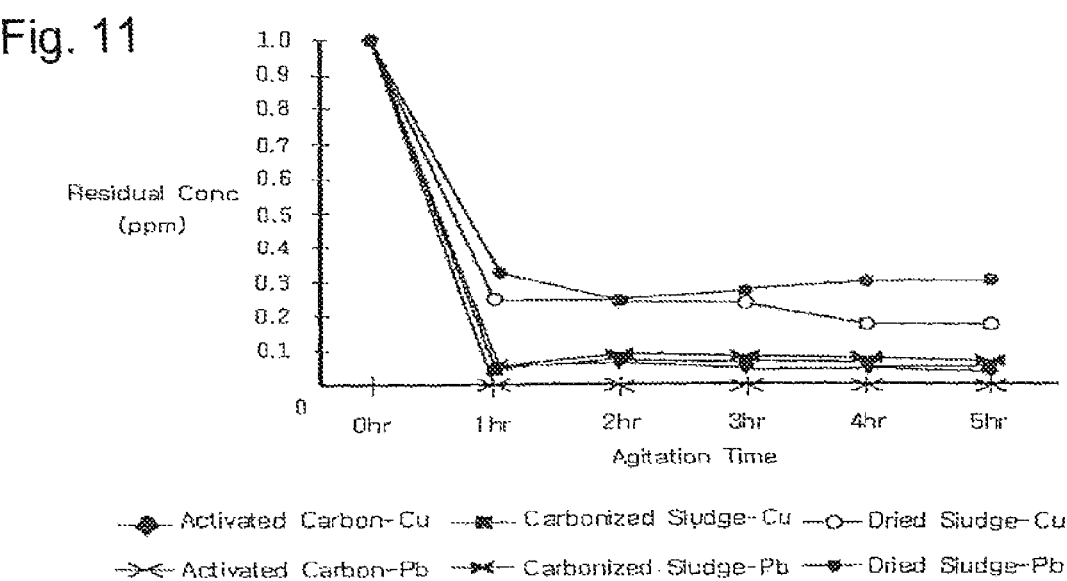

METHOD AND APPARATUS FOR TREATING WASTE MATERIALS

FIELD OF THE INVENTION

This present application is a national phase of PCT/CA2012/000147, filed Feb. 17, 2012, is based on, and claims priority from, Canada 2,733, 685, filed on Mar. 10, 2011, the disclosure of is also incorporated herein by reference. This invention relates to a method and apparatus for the treatment of waste sludges and, more particularly, relates to a method and apparatus for converting waste sludges containing food, sewage, garbage, construction waste and industrial waste into inert inorganic building products.

BACKGROUND

Various types of waste materials, such as food waste, industrial waste and garbage are disposed of by drying to reduce moisture and incinerated, or deposited directly as landfill. Significant environmental contamination often results from production of dioxins, carbon dioxide and nitrogen oxides. Landfill sites leach toxins such as heavy metals into surrounding ground water tables and organics convert into gases such as methane which pollute the atmosphere.

U.S. Pat. No. 4,872,993 discloses a method for treating waste water comprising adding clay and a flocculating agent to waste water which absorbs organic matter and heavy metals in the waste water to form a sludge separating the sludge from the water to reduce the water content to less than 60% by weight, and firing the sludge at a temperature of about 2000° F. to convert sludge particles to expanded ceramic particles. The solid residue powder can be heated to above about 200° C. and subjected to microwave energy at a wave energy frequency effective to decompose and depolymerize the resin. Alternatively the solid residue can heated to about 400° to 750° C. in an oxygen free atmosphere to depolymerise resins and to produce gaseous hydrocarbons, the hydrocarbons separately recovered, and the solids residue sintered at a temperature of about 750° to 1150° C. to produce chemically inert agglomerates.

U.S. Pat. No. 5,490,907 discloses a method for recovery of organic volatiles from an organic sludge containing 20 to 99% by weight solids in which clay powder is added and the mixture heated to about 350° C. in a distillation vessel to distil the volatiles and produce a granular solid residue. The solids residue can be used as an inert, environmentally safe raw material such as in the cement industry or recycled for use in the process as a reagent powder.

There is a need for treatment of a wide range of waste materials including sewage, garbage, construction and industrial waste and the like to minimize landfill and atmospheric pollution.

SUMMARY OF THE INVENTION

It is a principal object of the present invention to provide a method and apparatus for disposing of waste materials and for utilizing waste materials to produce building products.

It is another object of the invention to provide an efficient method of producing building products which avoids or minimizes production and escape of methane, carbon dioxide, nitrogen oxides and other noxious gases including dioxins into the atmosphere.

And another object of the process of the invention is the significant removal of heavy metals and the production of inorganic building products which encapsulate and render residual heavy metals inert.

In its broad aspect, the method of the invention comprises particulating wet waste materials into discrete particles, drying the particles in a non-oxidizing atmosphere at a temperature in the range of 800° to 860° C. for carbonizing the particles, crushing the dried carbonized particles into a size range of about 0.2-0.5 mm, leaching the crushed carbonized particles in an acid solution for dissolution of heavy metals in the solution, separating the leach solution containing heavy metals from the carbonized particles, drying the carbonized particles and adding to the dried carbonized particles particulate sodium hydroxide, silica, feldspar and limestone in a ratio of 100:0.3-0.5:8-2:8-12:2-4, preferably in a ratio of 100:0.3-0.5:10:10:3, mixing said carbonized particles and sodium hydroxide particles, silica particles, feldspar particles and limestone particles with 15 to 18% by weight water and continuously extruding the wet mixture to form an elongated continuous extrusion, severing the elongated extrusion into blocks or planks of predetermined length, drying the blocks or planks and heating the dried blocks in a kiln at a temperature in the range of 1200° to 1300° C. for a time sufficient in an oxygen deficient atmosphere to sinter the blocks and to form metal carbides, and separating and recovering $CO_2$ as from combustion gases in the kiln.

In its preferred aspect, the waste material is particulated into discrete particles about 1.5 to 2.5 mm in size, preferably about 2 mm in size, the discrete particles spread into a thin layer, and the thin layer of discrete particles heated for preliminary drying of the particles before carbonizing. The carbonized particles can be leached in a nitric acid solution, preferably 10 to 30 minutes, for dissolution of heavy metals, and the carbonized particles in the leach solution conveyed through and out of the leach solution on a permeable belt for separating the particles from the leach solution containing the heavy metals. The carbonized particles preferably are sprayed with sodium carbonate for neutralizing nitric acid thereon and the leach solution containing heavy metals neutralized with sodium carbonate to precipitate the heavy metals as metal carbonates. The blocks or planks are heated in the kiln in an oxygen deficient reducing atmosphere for about 6 to 7 hours for formation of metal carbides. A plasma thermal spray coating can be applied to the blocks or planks.

In its broad aspect, the system of the invention for treating waste material comprises, in sequence, a feeder for advancing and particulating the waste material, a drier for receiving the particulate waste material and for beating and drying the said particulate waste material to a temperature in the range of 800 to 860° C. in a non-oxidizing atmosphere for carbonizing the particulate waste material, a crusher for crushing the carbonized waste material to a size in the range of about 0.2 to 0.5 mm, a leach bath for containing an acid leach solution for leaching any metal constituents in the carbonized waste material, means for adding inorganic solids sand water to the leached carbonized waste material and for producing a wet mixture, an extruder for continuously extruding the wet mixture into an elongated extrusion, means for severing the elongated extrusion into blocks or planks, a kiln for heating the blocks or planks to a temperature in the range of 1200° C. to 1300° C. in an oxygen deficient atmosphere to sinter and carburize the blocks or planks, and means for collecting and removing $CO_2$ gas from combustion gases in the kiln.

In a preferred aspect, the system additionally comprises plasma thermal spray means for plasma thermal spray coating sintered and carburized planks or blocks. Conduit means are provided for recycling combustion gases from the kiln and means are provided for precipitating leached metals from the leach solution and for neutralizing leached carbonized waste material.

BRIEF DESCRIPTION OF THE DRAWINGS

Embodiments of the process of the invention will now be described with reference to the drawings, in which:

FIG. 10 is a graph illustrating viscosity of sludge feed slurry heated for tape casting;

FIG. 11 is a graph illustrating effect of residual time during pyrolysis and carbonizing of dried sludge using recycle heat.

DESCRIPTION OF THE PREFERRED EMBODIMENT

Figure 1:
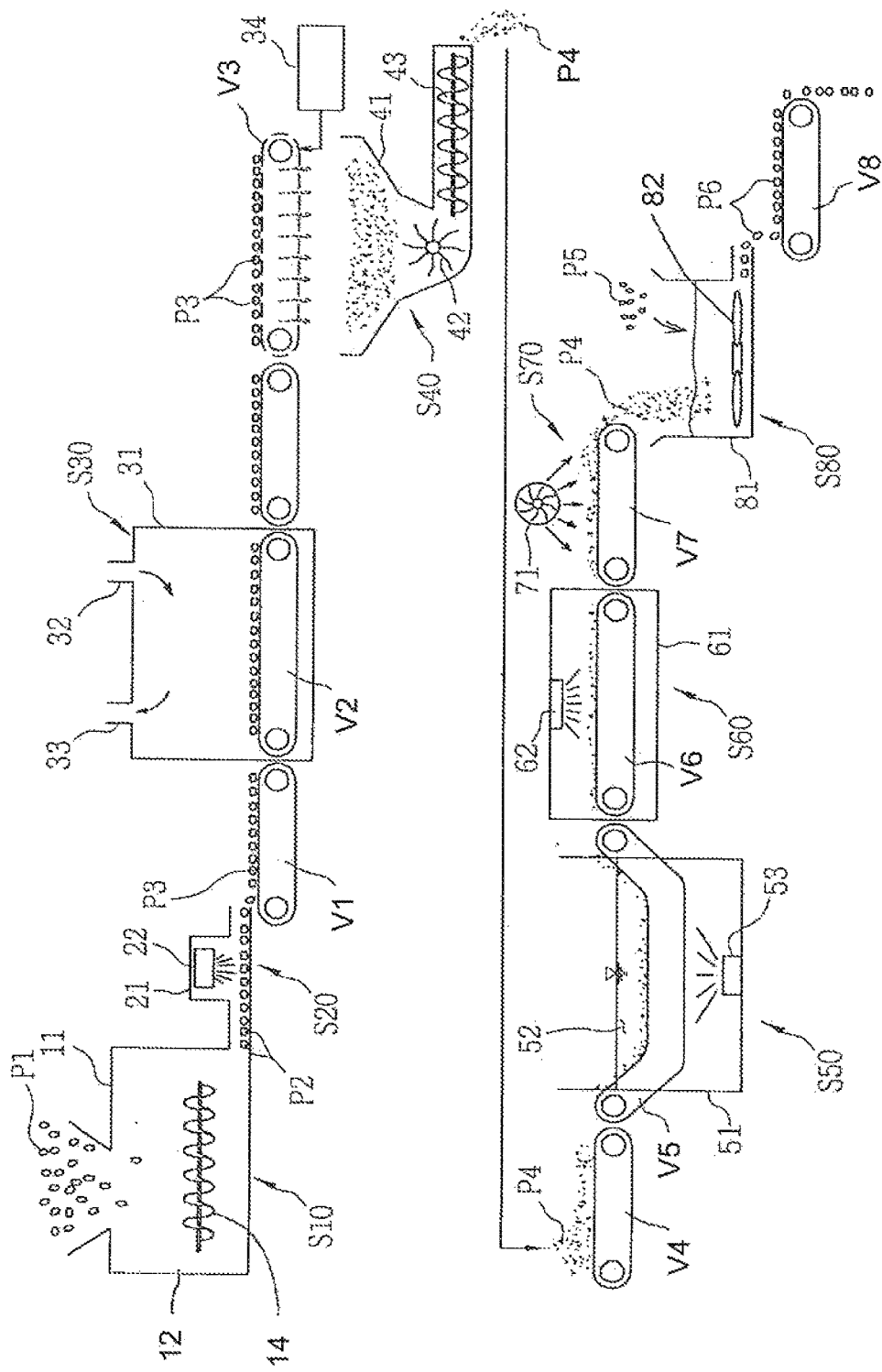
FIG. 1 is a schematic illustration of a flowsheet of the first half of the method of the present invention.
Figure 2:
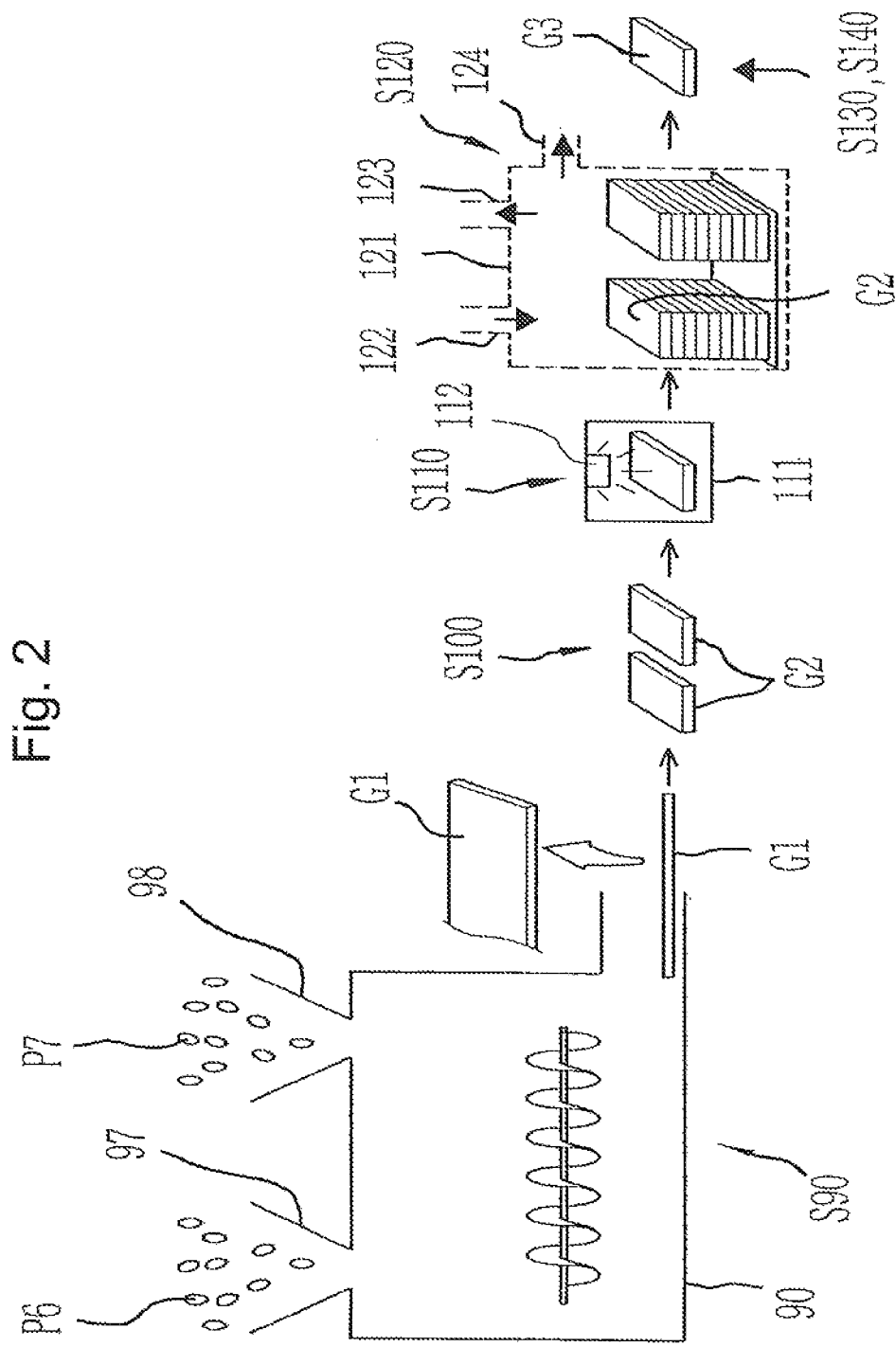
FIG. 2 is a schematic illustration of a flowsheet depicting the second half of the method of the present invention.
Figure 3:
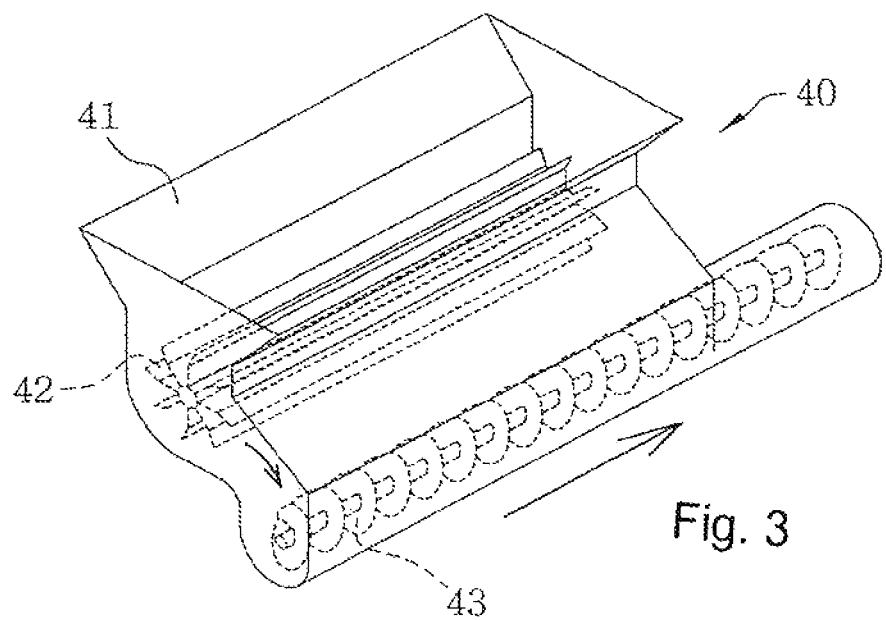
FIG. 3 is a perspective view of an embodiment of secondary crusher of the invention.

With reference to FIGS. 1 and 2, waste materials P1 including food waste, sewage sludge, construction and industrial waste, plastic bags and the like garbage are fed to the hopper 11 of crusher 12 of crushing stage S10 onto screw conveyor 14 for preliminary crushing to particles of about 1.5 to 2.5 mm in size, preferably about 2 mm. The particulate material is advanced as a thin wet slurry to tape injector 21 of heating stage S20 wherein burner 22 heats the slurry to reduce viscosity of the slurry, as indicated in FIG. 11, to about 4000 MPas for effective preliminary drying as a thin layer of discrete particles.

The waste feed typically has a solids content in the range of 23-27 wt % solids, the balance water. The physiochemical characteristics of the waste feed is typified in Table 1 below for a solids content of about 23 wt % and a liquid content of about 77 wt %.

TABLE 1

Physiochemical characteristics of sludge input

| Item | Unit | Dewatered Sludge |
|---|---|---|
| Water Contents | wt % | 77.0 |
| Solid Contents | wt % | 23.0 |
| Ash Contents | wt % | 50.0 |
| Organic Compound | wt % | 50.0 |

TABLE 1-continued

Physiochemical characteristics of sludge input

| Item | Unit | Dewatered Sludge |
|---|---|---|
| Contents | | |
| Calorific Value | cal/g | 2,497 |
| PH | — | 6.0 |

The thin layer of heated particles P3 is transferred by belt conveyor V1 onto metal conveyor V2 and into primary drier 31 of stage S30 which receives recycle hot gases through inlet 32 from downstream unit S120, to be discussed, the gases having a temperature in the range of about 800° to 860° C. The waste particles are dried in an essentially oxygen-free atmosphere and pyrolysed for carbonization of the organic waste materials. The thermal cracking of organic waste materials causes thermal distillation of hydrocarbons leaving a residue of carbon such as charcoal and the like carbonaceous material and ash. After decomposition of water, hydrocarbons and hydrogen sulphide inside waste sludge drier 31, it is believed there is a cracking of saturated ring-bonds at 340° C., carbonization at 80° C. transformation of bitumen components to the tar or heavy-oils in the range of 400-600° C., and decomposition of organics into carbons and low-molecule gaseous hydrocarbons at 350-400° C.

The waste from this carbonization process does not contain any dioxin components because they are thermally decomposed under reducing condition at over 800° C., dioxin components being cracked in the middle of the carbonization range.

The carbonaceous material has fine pores providing a large surface area with high adsorption capability. A substantial volume reduction to about one-twelfth of the original volume results with sterilization by destruction of bacteria and viruses. Almost complete thermal destruction of dioxin results with trace amounts of dioxin in the exhaust gases which are completely destroyed in the downstream carburizing step S120 to be described.

Table 2 and Table 3 below indicate the yield and Iodine Number at various carbonization temperatures for 30 minutes and various times at 860° C. respectively.

TABLE 2

Effect of carbonization temperature on yield and iodine adsorption (Carbonization time: 30 min)

| | Carbonization Temp | | | |
|---|---|---|---|---|
| Item | 400° C. | 500° C. | 600° C. | 860° C. |
| Iodine Number (mg/g) | 116.9 | 99.5 | 113.9 | 123.5 |
| Yield | 64.0 | 50.5 | 46.5 | 45.0 |

TABLE 3

Effect of carbonization time on yield and iodine adsorption (Carbonization temperature: 860° C.)

| | Carbonization Time | | |
|---|---|---|---|
| Item | 15 min | 30 min | 60 min |
| Iodine Number (mg/g) | 109.4 | 123.5 | 104.6 |
| Yield (%) | 46.3 | 45.0 | 44.0 |

FIG. 11 illustrates the effect of agitation time on residual concentration.

Table 4 below indicates the composition of a typical sludge before and after the drying carbonizing process in stage S30, in which DB=dry basis.

TABLE 4

Composition of Carbonized sludge output through Drying Process (S30)

| | | Results | |
|---|---|---|---|
| Item | Unit | Dried Sludge | Carbonized Sludge |
| Water Contents | wt % | 22.5 | 2.9 |
| Ash Contents | wt %-DB | 50.0 | 78.0 |

TABLE 4-continued

Composition of Carbonized sludge output through Drying Process (S30)

| | | | Results | |
|---|---|---|---|---|
| Item | | Unit | Dried Sludge | Carbonized Sludge |
| Calorific Value | | cal/g-DB | 2,949 | 1,152 |
| Element Analysis | C | wt %-DB | 23.3 | 11.3 |
| | H | wt %-DB | 4.0 | 0.59 |
| | O | wt %-DB | 18.1 | .505 |
| | N | wt %-DB | 3.5 | 0.52 |
| | S | wt %-DB | 0.57 | 0.06 |
| Content | Pb | mg/kg-DB | 114.4 | 174.1 |
| | Cu | mg/kg-DB | 219.4 | 235.7 |
| | As | mg/kg-DB | 0.9 | 1.8 |
| | Cr | mg/kg-DB | 34.7 | 44.5 |
| | Cd | mg/kg-DB | 1.9 | 1.4 |

Figure 4:
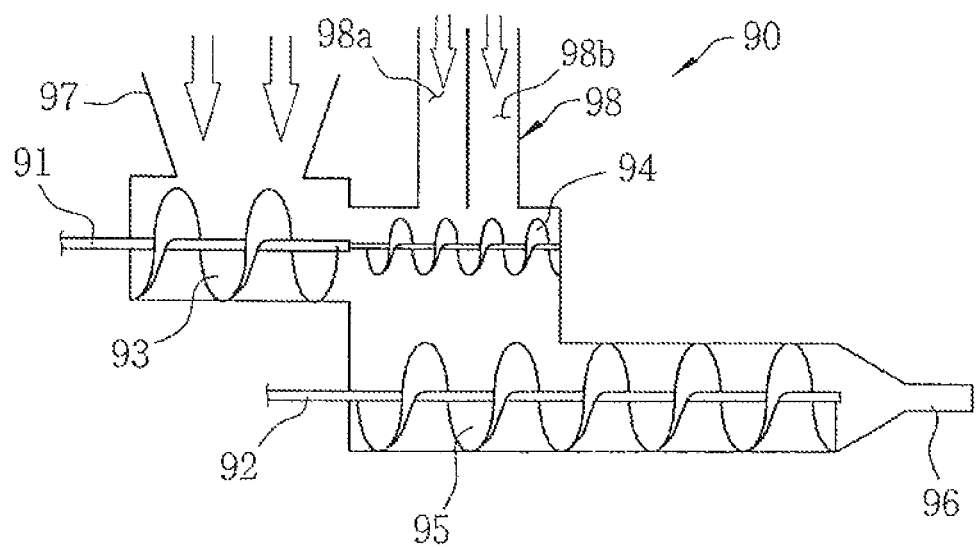
FIG. 4 is a longitudinal sectional view of an embodiment of extruder of the invention.

Particles P3 are conveyed by slatted metal conveyor V3 which is vibrated by vibrator 34 over hopper 41 causing the discrete particles to fall through the open slats of the conveyor into enclosed hopper 41 of crusher stage S40, illustrated in more detail in FIG. 4, under a partial vacuum to collect and separate dust particles. Rotating radial agitator 42 journaled for rotation across hopper 41 advances the particles onto auger 43 which concurrently advances and crushes the dried particles P4 to a size in the range of 0.2-0.5 mm.

Belt conveyor V4 transfers the particles P4 to tank 51 of an acid leach bath S50, preferably having a nitric acid solution with a pH of 2-3, density of 1.115 and a concentration of 3.54 mol/L for a retention time of about 10 to 30 minutes; preferably about 20-30 minutes, and most preferably about 30 minutes, for leaching of heavy metals such as copper, lead, zinc and cadmium. Polypropylene belt conveyor V5 having a dialyser membrane layer conveys the particles through tank 51 over ultrasonic transducer 53 for ultrasonic agitation of the bath for about the preferred 20-30 minutes, most preferably about 30 minutes, with infiltration of the acid solution into the porous and permeable carbonized waste particles. The metals (M) in the waste particles dissolve into the solution as typified by copper as: $2HNO_3 + Cu \rightarrow Cu(NO_3)_2 + H_2(gas)$. The $M(NO_3)_2$ cations in solution are separated from the solid particles by passage of the metal-bearing solution through the polypropylene chain conveyor V5 having the dialyser membrane. The solid particles are conveyed through and out of tank 51 onto belt conveyor V6 of drying stage S70. The acid solution with the cations in tank 51 which passes through the dialyzer filter can be isolated and neutralized by the addition of sodium carbonate solution to precipitate the metals as metal carbonates, typified for example by copper as $Cu(NO_3)_2 + NaCO_3 \rightarrow CuCO_3 + Na(NO)_3$. Heavy metal removal, with and without ultrasonic assistance, is typified in Table 5.

TABLE 5

Heavy metal removal process with nitric acid solution and ultrasonic equipment

| | | 10 min (mg/kg) | | 20 min (mg/kg) | | 30 min (mg/kg) | |
|---|---|---|---|---|---|---|---|
| element | input (mg/kg) | Without ultrasonic | With Ultrasonic | Without ultrasonic | With Ultrasonic | Without ultrasonic | With Ultrasonic |
| Pb | 5.00 | 3.00 | 1.45 | 1.28 | 0.50 | 0.87 | 0.35 |
| As | 3.00 | 2.48 | 0.67 | 1.35 | 0.07 | 0.65 | 0.06 |
| Hg | 0.20 | 0.16 | 0.07 | 0.11 | 0.01 | 0.04 | 0.01 |
| Cd | 0.30 | 0.19 | 0.11 | 0.19 | 0.02 | 0.07 | 0.01 |

Figure 12:
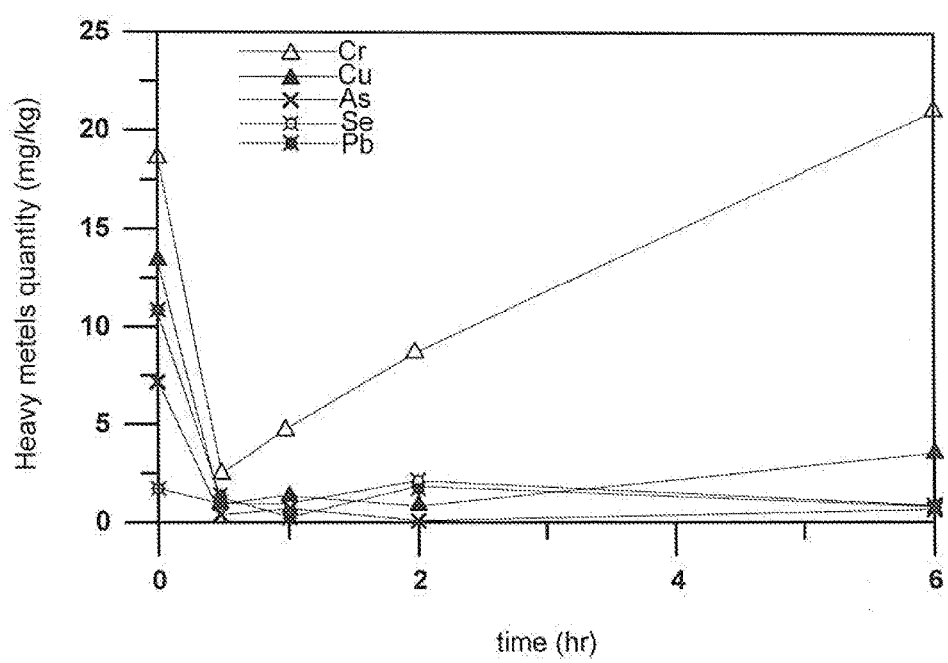
FIG. 12 is a graph illustrating heavy metal removal in a nitric acid leach with and without the acid of ultrasonics.

FIG. 12 illustrates graphically the leaching of heavy metals with time as indicated in Table 5, with and without ultrasonic agitation, optimum leaching occurring at about 20-30 minutes.

The leached waste particles P4 are conveyed from tank 51 to high pressure scrubber 61 of neutralizing stage S60 in which sprayer 62 directs sodium carbonate solution at high pressure and velocity onto the waste particles travelling on belt conveyor V6 to neutralize the nitric acid on the particles.

The neutralized particles are surface dried by passage on belt conveyor V6 under a forced draft fan 71 in stage S70 and fed to feed hopper 81 of mixing stage S80 wherein the waste particles P4 are blended with sodium hydroxide particles, silica particles, feldspar particles and limestone particles in a ratio in the ranges of 100:0.3-0.5:8-12:8-12: 2-4; preferably in the range of 100:0.3-0.5:10:10:3. The mixture is mixed by propeller mixer 82 with the addition of 15-18 wt % water and conveyed by conveyor V8 to hopper 97 of vacuum extruder 90 at stage S90, shown in more detail in FIG. 4. Extruder 90 comprises a primary screw auger 91 journaled tot rotation below waste feed hopper 97 and feed inlet 98 for particulate additives such as colour powders to provide a marble or streak effect to the extrusion. Auger 91 has a large diameter screw portion 93 for the particulate waste material and relatively small diameter screw portion 94 for mixing of the colour additives 98a, 98b to enhance marbling effects. Typical inorganic colour additive's are kaolin for white colour, cobalt oxide for blue colour, chrome oxide for green colour, copper oxide for green, red or black colours, and iron oxide for reddish brown.

Figure 5:
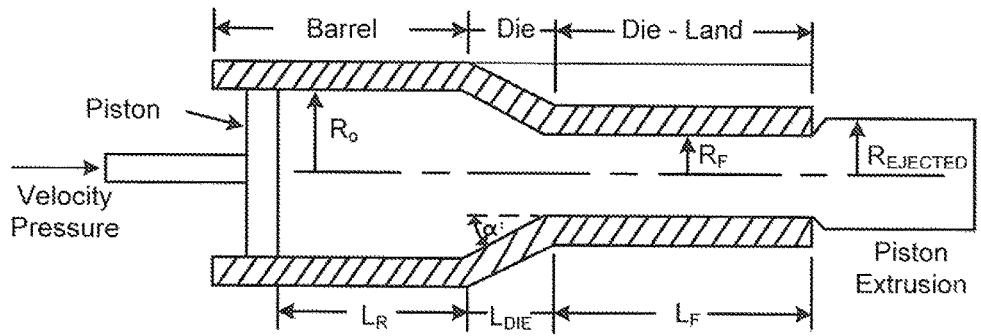
FIG. 5 is a sectional view of a vacuum piston extruder known in the art.
Figure 6:
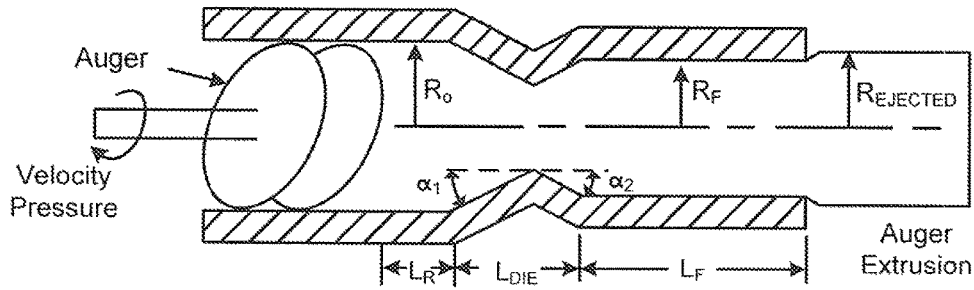
FIG. 6 is a sectional view of a vacuum auger extruder known in the art.
Figure 7:
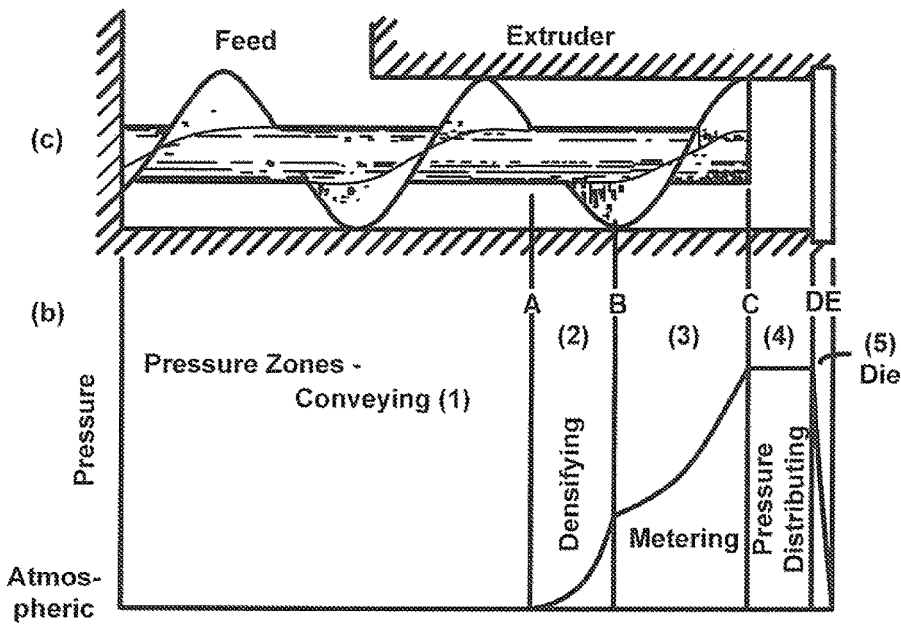
FIG. 7 is a sectional view of the pressure zones in an auger extruder known in the art.

Secondary auger 92 has screw 95 for advancing the mixture with the 15-18 wt % water under pressure through die orifice 96, preferably having a rectangular cross-section opening. FIGS. 5 and 6 show prior art vacuum extruder dies for piston and auger extruders respectively. FIG. 7 illustrates the pressure zones of the secondary auger extruder of the invention, with Table 6 typifying flow properties determined by an extrusion rheometer.

TABLE 6

Flow properties determined by using extrusion rheometer

| Property | Electrical Porcelainα | Cordierite | Cordierite + Lubeα |
|---|---|---|---|
| Die-entry | | | |
| $\ddot{y}_b$ (kPa) | 160 | 850 | 520 |
| $k_b$ kPa/(mm/min)$_n$ | 200 | 30 | 13 |
| n Shear thin | 0.3 | 0.3 | 0.4 |
| Die-land | | | |
| $\ddot{y}_f$ (kPa) | 6 | 57 | 6 |
| $k_f$ kPa/(mm/min)$_m$ | 0.7 | 1.4 | 0.1 |
| m Shear thin | 0.5 | 0.5 | 0.8 |

The extrusion G1 is severed transversely into blocks or planks G2 by a saw at stage S100 and dried sequentially, such as by microwave unit 112 in drying stage S110 to minimize shrinkage, prior to loading in stacks in kiln or furnace 121 in high temperature sintering stage S120.

Figure 8:
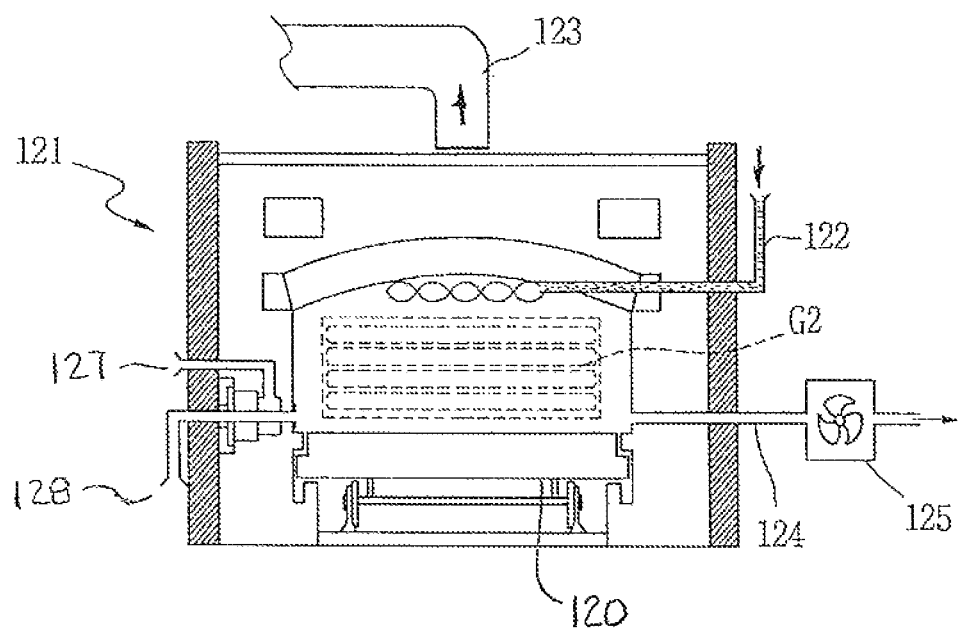
FIG. 8 is a longitudinal sectional view of a high-temperature kiln or furnace of the invention.

The kiln 121, shown schematically in more detail in FIG. 8, comprises a base 120 on which the planks 62 are stacked. Furnace 121 is tired by combustion of natural gas with air at inlets 127, 128 to a temperature in the range of 1200-1300° C. Gas inlet 122 receives hot gases from outlet 32 of upstream drier 31. A portion of combustion gases containing $CO_2$ and $NO_X$ are discharged through outlet 123 for $CO_2$ recovery and the remainder recycled through outlet 124 by exhaust fan 125 to inlet 32 of drier 31. The stacked planks are sintered in kiln 121 for about 6-7 hours under controlled reducing conditions for the production of metal carbides from the remaining metals. The furnace is initially fired by combustion of natural gas to achieve the desired temperature in the range of 1200-1300° C. with combustion products discharged to $CO_2$ collection stage S130 and to drier stage S30. The kiln discharge damper is partially closed at the end of the firing phase to provide a reducing atmosphere in the presence of carbonized Waste particles for carburizing the metals and silica.

The hot exhaust gases discharged through outlet 123 are passed through a dust collector, not shown at a temperature of about 420-560° C. with a heat loss of about 70 celsius degrees and heated up to the desired reducing temperature of 800-860° C. by combustion of low pressure gas (LPG) or liquefied natural gas (LNG) with a deficiency of oxygen to produce CO and these hot gases fed to drier stage S30 and maintained oxygen deficient for suitable carbonizing conditions.

Figure 9:
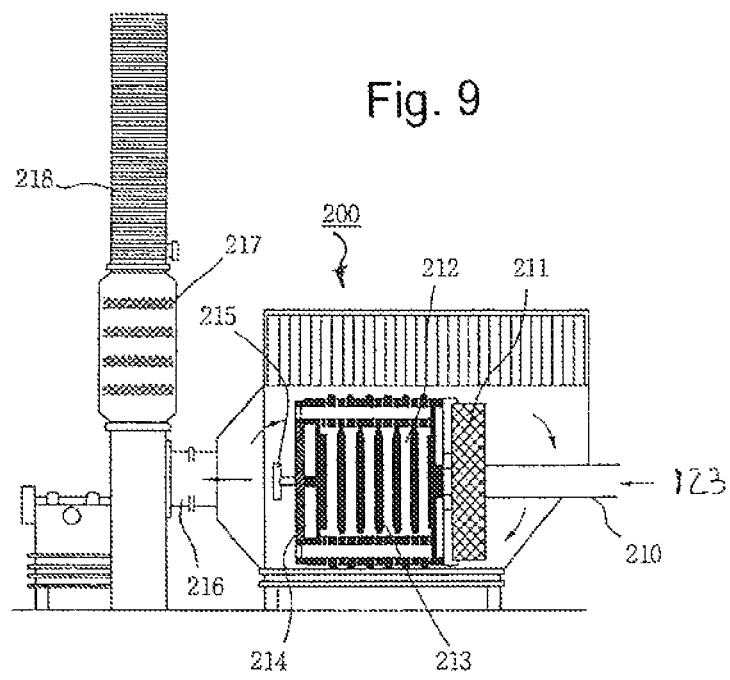
FIG. 9 is a longitudinal sectional view of a carbon dioxide extraction unit of the invention.

$CO_2$ collection stage S130 shown in FIG. 9 comprises enclosure 200 having inlet 210 communicated by ducting with outlet 123 of kiln 121 for receiving a portion of combustion gases containing carbon dioxide. A series of primary 211, secondary 212 and tertiary 213 absorbent units absorb carbon dioxide from the hot combustion gases. Fan impellor 215 circulates the combustion gases within enclosure 200. Primary absorber 211 preferably is dry-absorbent $NHCO_3$, secondary absorber 212 preferably is $MHCO_3$, and dry-absorbent 213 preferably is $M_3CO_3$. A fourth $CO_2$ absorber 217 in exhaust stack 218 preferably is a mixture of $Al_2O_3$ and $TiO_2$.

The sintered and carburized planks G3 from furnace 121 preferably are passed through a plasma thermal spray coating stage S140, well known in the art, to seal the plank exterior surfaces to ensure leaching of residual heavy metals is prevented.

The present invention provides a number of important advantages. Wet slurries of waste materials containing organic materials and heavy metals heretofore deposited in landfill sites to pollute the environment can be efficiently treated by carbonizing organic materials to render the heavy metals easily soluble in leach solutions for separation and recovery of the heavy metals from the solids, and the carbonized solids with inorganic additives extruded to form planks or blocks which are carburized to convert residual heavy metals to carbides in insoluble planks or blocks.

It will be understood that other embodiments and examples of the invention will be readily apparent to a person skilled in the art the scope and purview of the invention being defined in the appended claims.

The invention claimed is:

1. A method for treating waste materials comprising organic and inorganic material, the method comprising, particulating the waste materials into discrete particles, heating and drying the particles in a non-oxidizing atmosphere in a drier at a temperature in the range of 800° to 860° C. for carbonizing the particles, crushing the carbonized particles into a size range of about 0.2 to 0.5 mm, leaching the crushed carbonized particles in a bath of an acid solution for dissolution of heavy metals into the solution, separating the leach solution containing heavy metal from the carbonized particles, adding to the carbonized particles particulate sodium hydroxide, silica, feldspar and limestone in a ratio of 100:0.3-0.5:8-12:2-4, mixing said carbonized particles and sodium hydroxide particles, silica particles, feldspar particles and limestone particles with 15 to 18% by weight water to form a wet mixture and continuously extruding the wet mixture to form an elongated continuous extrusion, severing the elongated extrusion into blocks or planks of predetermined length, drying the blocks or planks and heating the dried blocks or planks in a kiln at a temperature in the range of 1200° to 1300° C. for a time sufficient in an oxygen deficient atmosphere to sinter the blocks or planks and to form carbides, and separating and recovering $CO_2$ gas from combustion gases in the kiln.

2. A method as claimed in claim 1, particulating the waste material to discrete particles about 1.5 to 2.5 mm in size, spreading the discrete particles into a thin layer and heating the thin layer of discrete particles for preliminary drying the particles before carbonizing.

3. A method as claimed in claim 1, in which the carbonized particles are leached in a nitric acid solution for dissolution of heavy metals, and passing the carbonized particles in the leach solution through and out of the leach solution on a permeable belt for separating the particles from the leach solution containing the heavy metals.

4. A method as claimed in claim 3, in which the carbonized particles are sprayed with sodium carbonate for neutralizing nitric acid thereon.

5. A method as claimed in claim 3, in which the carbonized particles are leached in the nitric acid solution for about 10 to 30 minutes.

6. A method as claimed in claim 1, in which the carbonized particles are mixed with sodium hydroxide, silica, feldspar and limestone in a ratio of 100:0.3-0.5:10:10:3.

7. A method as claimed in claim 4, in which the leach solution containing dissolved heavy metals is neutralized with sodium carbonate for precipitation and recovery of heavy metals as metal carbonates.

8. A method as claimed in claim 1, in which the blocks or planks are heated in the kiln in an oxygen deficient reducing atmosphere for about 6 to 7 hours for formation of metal carbides.

9. A method as claimed in claim 1, applying a plasma thermal spray coating to the blocks or planks.

10. A method as claimed in claim 1, continuously extruding the wet mixture by vacuum extrusion.

11. A method as claimed in claim 1, adding a particulate inorganic colour additive to the wet mixture while mixing the wet mixture and prior to extrusion to provide a marble or streak effect to the extrusion.

12. A method as claimed in claim 1, recycling at least a portion of combustion gases from the kiln to the drier.

13. A method as claimed as claim 12, heating the recycle combustion gases from the kiln to the drier.

14. A method as claimed in claim 1, applying ultrasonic agitation to the bath of acid solution to assist dissolution of the heavy metals into the acid solution.

15. The method of claim 1 wherein the waste materials comprise any of food waste, sewage, garbage, construction waste and industrial waste.

\* \* \* \* \*